Sept. 2, 1924.
W. KÜCHEMANN ET AL
1,507,490
PISTON
Filed Feb. 27, 1924
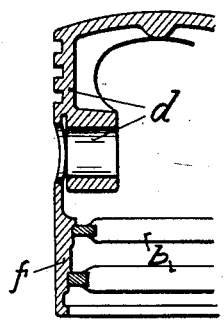
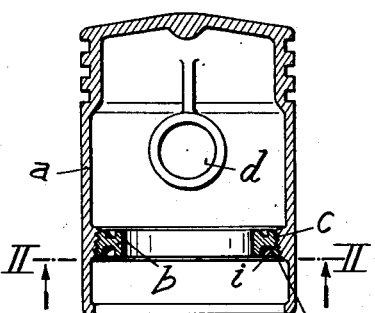
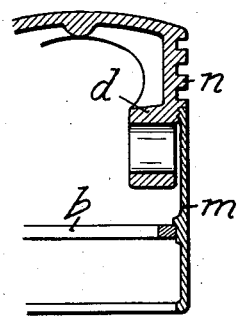
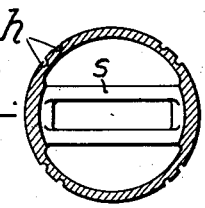
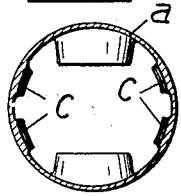
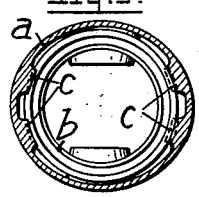
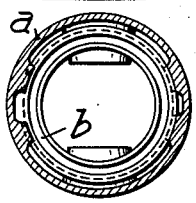
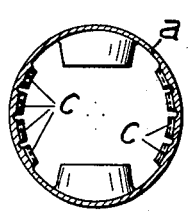
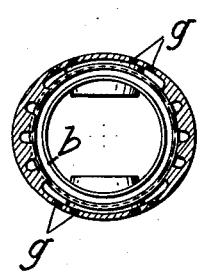
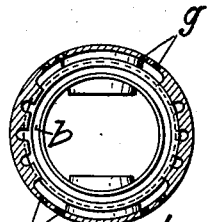
Inventors:
Willy Küchemann
Franz Wacherer
by
Attorney.

Patented Sept. 2, 1924.

1,507,490

UNITED STATES PATENT OFFICE.

WILLY KÜCHEMANN, OF BERLIN-WILMERSDORF, AND FRANZ WUCHERER, OF BERLIN-CHARLOTTENBURG, GERMANY.

PISTON.

Application filed February 27, 1924. Serial No. 695,495.

*To all whom it may concern:*

Be it known that we, WILLY KÜCHEMANN and FRANZ WUCHERER, citizens of Germany and Austria, respectively, residing at Berlin-Wilmersdorf, Germany, and Berlin-Charlottenburg, Germany, respectively, have invented certain new and useful Improvements in Pistons, of which the following is a specification.

Our invention refers to pistons and more especially to the pistons of internal combustion engines made of aluminium and magnesium alloys. It is an object of our invention to so construct pistons of this kind that their efficiency is increased and their life lengthened as compared with similar pistons hitherto made.

This pistons for internal combustion motors consisting of alloys of aluminium and magnesium owing to the great heat expansion of these materials, must have considerable clearance relatively to the cylinder walls, in order to prevent the piston from seizing when the engine is running at high speed and the piston is highly heated. Owing to this larger clearance the piston when working in cold condition is free to move laterally, this motion taking place almost exclusively at right angles to the piston pin. This motion is accompanied by a rattling noise and involves wear of the piston and of the working surface of the cylinder. In the upper part of this position the lateral motion is damped by the piston rings which establish a permanent contact between the cylinder and the piston.

In order to avoid this drawback, it has been proposed to make the piston untrue or out of centre, the diameter of the piston at right angles to the piston pin being often made larger than the diameter in the direction of the piston pin axis. In this construction the piston body was made elastic in order to be capable, when heated, of applying itself to the cylinder wall. Pistons of the kind described however involve the disadvantage that in order that the piston be capable of closely applying itself to the cylinder wall, the cylinder body must be very weak. In spite thereof a piston of this kind will exert unduly high pressure on the cylinder wall.

According to the present invention these drawbacks and disadvantages are avoided by providing means, whereby the piston, when cooled, is deformed in a manner which will cause the deformation of the piston to disappear when the piston is heated, thereby providing that the play or clearance of the piston relatively to the cylinder walls at right angles to the piston pin will remain substantially the same, whether the piston be hot or cold.

In the drawings affixed to this specification and forming part thereof several pistons embodying our invention are illustrated diagrammatically by way of example.

In the drawings:

Fig. 1 is an axial section of a piston with a conical ring inserted therein.

Fig. 2 being a cross section on the line II—II viewed in the direction of the arrows in Fig. 1 with the ring removed.

Fig. 3 is a similar view showing the conical ring in position in the piston body, the deformation of the body being largely exaggerated.

Fig. 4 is a similar view illustrating the compensation of the deformation in heated condition.

Fig. 5 is another cross section of a piston the conical ring being replaced by a cross beam.

Fig. 6 is a cross section of a piston being made untrue from the beginning.

Fig. 7 is a similar view showing the conical ring inserted in this piston, the deformation of the piston having again exaggerated for the sake of clearness.

Fig. 8 illustrates the compensation of the two deformations, when the piston is heated.

Fig. 9 is an axial section of another form of piston, in which the eyes for the piston pin are fixed to the upper part of the piston only, the ring or rings being fixed in place in the piston.

Fig. 10 is a similar view of a piston made in two parts screwed together.

Referring first to Fig. 1, *a* is a piston body and *d* is one of the eyes for the piston pin. In the lower part of the hollow piston body there is provided a screw threaded conical seat *c*, this seat extending only over part of the inner circumference so that two pairs of small diametrically opposite seats *c* are provided. A screw threaded conical ring *b* is screwed into the piston, engaging the seats *c*, a clearance being left between the ring and the parts of the cylinder wall intermediate the two pairs of seats *c*.

Obviously, if the piston body is so dimensioned that in cold condition it fits into the cylinder with a normal clearance the same piston after the ring *b* has been screwed home onto the seats *c*, will be distorted or deformed as shown in an exaggerated manner in Fig. 3, those portions of the piston which carry the seats *c*, being pressed outwards, while the portions intermediate the seats *c*, are forced inwards. Owing to this deformation the clearance between the cold piston and the cylinder will be smaller in the direction of the seats than in the direction at right angles thereto. If now the piston is heated the engine running at high speed, the portions of the piston body intermediate the seats *c* being free and not in contact with the ring will expand to a greater extent than the portions, where the seats are in contact with the ring and which being already forced outwards by the ring, have not the same tendency to expand and are besides cooled by the contact with the ring *b*, which is kept cooler by contact with the air. In consequence thereof the distorted piston body on being heated will assume its true circular shape and will work like a normal piston.

Preferably the ring *b* is made of a material such as cast iron which has only a low specific heat expansion and consequently has not the tendency of changing its form.

Instead of providing the piston with two pairs of seats *c*, we may also provide only two diametrically opposite seats.

In the modifications illustrated in Fig. 5 the ring *b* is replaced by a cross beam *s*, which will act in precisely the same manner.

In the modification illustrated in Figs. 6 to 8, a piston is shown, the diameter of which in the axis of the piston pin is larger in cold condition than the diameter at right angles thereto. This is done in order to provide for the case that the character of the materials constituting the piston should prevent this latter from fully assuming its circular form on being heated. An untrue piston can be obtained by screwing the conical ring onto its seat and then machining the piston. On the ring being removed the piston will have an oval section. In this modification four seats *c* are provided on either side of the piston wall, and after the ring is screwed home, the piston will assume the form shown in Fig. 7 in an exaggerated manner. On being heated the piston will assume the circular form intermediate those shown in Figs. 6 and 7, this form being illustrated in Fig. 8.

In order to facilitate and regulate the deformation of the piston when screwing the ring in, apertures *g* (Figs. 7 and 8) can be provided in the piston body and grooves *h* (Fig. 5) can be provided in the outer piston wall.

We can advantageously insert the ring or beam in the piston in such manner that we make a piston having the normal clearance with reference to the cylinder, while the ring or beam is so dimensioned as to fit in the piston, when this latter is heated. In this case the piston on cooling will have a greater diameter in the direction at right angles to the piston pin axis than in the direction of this axis.

The piston and the ring or beam are formed of materials of different coefficient of expansion in order to obtain the compensation from the distorted condition to a cylindrical shape.

Instead of employing a threaded ring or beam, we can also employ rings or beams with a plain face, two such rings being for instance shown as being forced onto two seats provided in the piston illustrated in Fig. 9. The piston is here shown with the eyes *d* for the piston pin fixed to the upper part of the piston only.

As shown in Fig. 10 the piston may be made in two parts, the upper part *n* being screwed into the lower part *m* which is thus free to expand without being affected by the pressure exerted by the piston pin.

Obviously the rings *b* or beams *s* can also be used when the piston is worn down for so deforming it as to apply it to the cylinder wall without an unduly great clearance.

We wish it to be understood that we do not desire to be limited to the exact details of construction shown and described, for obvious modifications will occur to a person skilled in the art.

We claim:—

1. A piston comprising a hollow body, a piston pin extending across said body, and means movable longitudinally of the piston for increasing the outer diameter thereof only at opposite points to cause said body to be deformed into other than a circular configuration.

2. A piston comprising a hollow body having a skirt portion, a piston pin extending across said body, and means movable longitudinally of the skirt portion for increasing the outer diameter thereof only at opposite points substantially at a right angle to said pin.

3. Piston comprising a hollow body and a ring adjustable longitudinally of the piston for exerting pressure in radial direction upon two diametrically opposite points of the inner wall of said body, said ring being spaced from said wall between said points.

4. Piston comprising a hollow body, a piston pin extending across said body and means for exerting pressure in radial direction upon two diametrically opposite inclined faces on the inner wall of said body at right angles to said pin and spaced from said wall intermediate said faces.

5. Piston comprising a hollow body, a piston pin extending across said body, said body having a larger outer diameter in the direction of said pin, and means for causing said body to assume a larger outer diameter in a direction at right angles to said pin.

6. A piston comprising a hollow body, a piston pin extending across said body, two seats upon diametrically opposite points of the inner wall of said body having inclined faces, the line of intersection of said seats extending at right angles to said pin, and means movable longitudinally upon said faces and spaced from said wall intermediate thereof for producing a longer diameter of said body extending through said seats than in the line of said pin.

7. Piston comprising a hollow body, a piston pin extending across said body, two threaded conical seats disposed on diametrically opposite points of the inner wall of said body with their line of intersection extending at right angles to said pin, and a threaded conical ring fitting on said seats, and spaced from said wall intermediate thereof.

8. Piston comprising a hollow body of slightly oval circumferential shape, a piston pin extending across said body in the direction of its larger diameter, two seats disposed on diametrically opposite points of the inner wall of said body with their line of intersection at right angles to said pin and means adapted to cooperate with said seats for exerting radial pressure on said seats so as to deform said body until the larger diameter extends through said seats.

9. The method of making a hollow piston which consists in forming the piston oval shaped with its major transverse axis in the direction of the axis of the piston pin, mechanically deforming said piston upon the line of its minor axis by application of stress at opposite sides of the piston to dispose its major axis at a right angle to the axis of the piston pin, and maintaining the dimension of said deformation through the stress applying means, said stress applying means having a lower coefficient of expansion than the piston whereby upon heating the piston is expanded on the major axis first mentioned to produce a cylindrical configuration.

In testimony whereof we affix our signatures.

WILLY KÜCHEMANN.
FRANZ WUCHERER.